(12) United States Patent
Steeves et al.

(10) Patent No.: US 7,565,330 B2
(45) Date of Patent: Jul. 21, 2009

(54) SECURE ONLINE TRANSACTIONS USING A CAPTCHA IMAGE AS A WATERMARK

(75) Inventors: David J. Steeves, Seattle, WA (US); Mwende Window Snyder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/466,303

(22) Filed: Aug. 22, 2006

(65) Prior Publication Data

US 2007/0005500 A1    Jan. 4, 2007

Related U.S. Application Data

(63) Continuation of application No. 11/157,336, filed on Jun. 20, 2005, now Pat. No. 7,200,576.

(51) Int. Cl.
*G06F 17/60* (2006.01)

(52) U.S. Cl. .............................. 705/75; 705/64; 705/65; 705/66

(58) Field of Classification Search ................... 705/75, 705/64, 65, 66
See application file for complete search history.

(56) References Cited

U.S. PATENT DOCUMENTS 7,006,661 B2 *   2/2006   Miller et al. ................ 382/100
7,200,576 B2     4/2007   Steeves et al.
2003/0005464 A1* 1/2003   Gropper et al. ............. 725/115
2003/0110400 A1  6/2003   Cartmell et al.
2003/0172283 A1  9/2003   O'Hara
2005/0065802 A1  3/2005   Rui et al.
2005/0246193 A1  11/2005  Roever et al.
2007/0028109 A1  2/2007   Wysocki

FOREIGN PATENT DOCUMENTS

JP          411085548 A  *  3/1999

OTHER PUBLICATIONS

U.S. Appl. No. 11/177,231, filed Jul. 8, 2005, Steeves.
U.S. Appl. No. 11/254,497, filed Oct. 20, 2005, Steeves.
U.S. Appl. No. 11/303,441, filed Dec. 15, 2005, Steeves.
U.S. Appl. No. 11/264,369, filed Nov. 1, 2005, Ellison.

* cited by examiner

*Primary Examiner*—Pierre E Elisca
(74) *Attorney, Agent, or Firm*—Perkins Coie LLP

(57) ABSTRACT

Techniques for conducting secure online transactions using captcha images as watermarks are provided. Some techniques combine a trusted, secure device that utilizes a key to generate identifiers with a watermarked transaction verification request page to provide secure online transactions. The trusted, secure devices are provided to users for use in transacting with a transaction provider. In processing a transaction requested by a user, the transaction provider determines an identifier that should be being currently generated by the user's trusted, secure device, creates a captcha image of the identifier, and watermarks a transaction verification request page using the captcha image. The transaction provider then requests that the user verify the transaction described in the transaction verification request page by providing the next identifier that is generated by the user's trusted, secure device to the transaction provider.

16 Claims, 7 Drawing Sheets

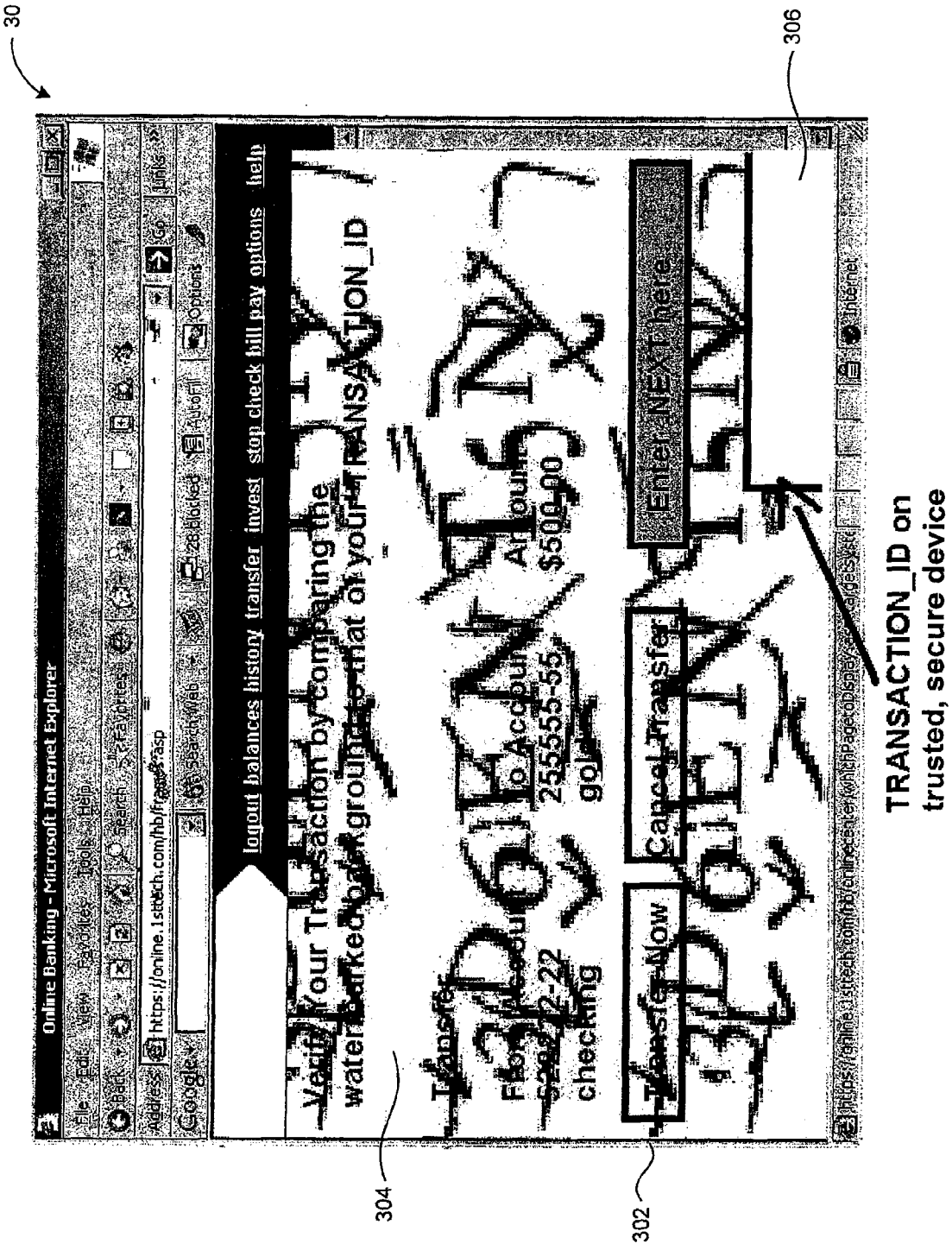

SECURE ONLINE TRANSACTIONS USING A CAPTCHA IMAGE AS A WATERMARK

CROSS REFERENCE TO RELATED APPLICATIONS

This application is a continuation of U.S. patent application No. 11/157,336 filed Jun. 20, 2005, which is incorporated by reference herein in its entirety.

BACKGROUND

The proliferation of computers and the maturing of the World Wide Web ("web") have resulted in the web increasingly becoming a medium used to conduct online commerce. Indeed, a broad range of commercial and financial transactions may be conducted over the web.

For example, increasing numbers of web merchants provide websites that a user (e.g., consumer) who plans to purchase a product can access (i.e., visit) to view information about the product, select the product for purchase, place an order for the product, and provide information, such as payment and shipping information, needed to complete the purchase all electronically online over the web. The user typically provides an account number (e.g., credit card account number, debit card account number, checking account number, etc.) as part of the payment information.

Like the web merchants, increasing numbers of financial institutions are also providing their customers online services over the web. For example, many banks now provide their customers the ability to perform numerous online transactions, such as online banking, online funds transfer, online bill payment, online trading, etc., over the web. In a typical online banking transaction, the user provides identification information, such as an account number and password, to gain remote access to the user's account. The user then requests one or more online transactions that involve the accessed account.

The increase in the level of online transactions has also brought about an increase in the levels of identity theft, account takeover, and online fraud. The common threat to online transactions is the use of usernames and passwords. The use and transmission of sensitive information (i.e., usernames, account numbers, passwords, etc.) over the web, Internet, or other unsecured networks, has increased the threat that this information may be intercepted or stolen at the user's computing system, while in transit from the user's computing system to the online merchant's website, or at the merchant's website or server computing system.

One threat is a phishing attack. In a phishing attack, a user is tricked into providing the user's sensitive information (e.g., account numbers, login identification, passwords, PINs, etc.) to a malicious user, typically referred to as a "phisher." For example, in online banking, a phisher would try to trick a user into providing the user's account number and password. Once the phisher has the user's account number and password, the phisher can online bank as the user.

Another threat is a "man in the middle" attack. A man in the middle attack occurs when a "hacker" gets between a user's computing system (e.g., client or client computing system) and the merchant's website. For example, using social engineering, the hacker may trick the user into thinking that the hacker is the user's bank, for example, through a hyperlink in an email message (e.g., an email message that appears to be sent by a reliable source, such as the user's bank) or other hyperlinks. If the website addressed by the hyperlink appears identical or very similar to the user's bank's website, the user is likely to login, and, at this point, the hacker will have the information needed to perform online fraud.

Still another threat is the possibility of the user's computing system becoming fully compromised. For example, a remote shell to the hacker or a "trojan" listening for the user to access the user's bank's website may be installed and executing on an unsuspecting user's computing system.

SUMMARY

A transaction provider combines a trusted, secure device that utilizes a key to generate identifiers with a watermarked transaction verification request page to provide secure online transactions. The trusted, secure devices are provided to users for use in transacting with the transaction provider. In processing a transaction requested by a user, the transaction provider determines an identifier that should be being currently generated by the user's trusted, secure device, creates a captcha image of the identifier, and watermarks a transaction verification request page using the captcha image. The transaction provider then requests that the user verify the transaction described in the transaction verification request page by providing the next identifier that is generated by the user's trusted, secure device to the transaction provider.

The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

FIG. 3 is a display diagram showing a sample transaction verification request page having a captcha image as a watermark, according to some embodiments.

DETAILED DESCRIPTION

Figure 1:
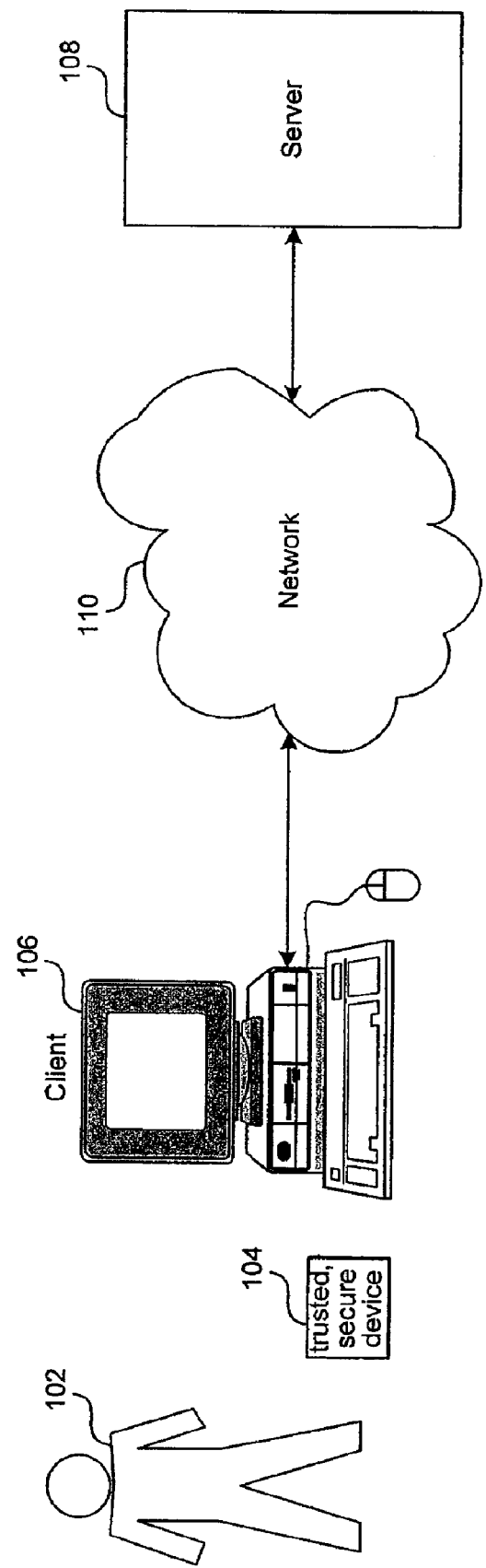
FIG. 1 is a high-level block diagram showing an environment in which the secure online transactions may operate.

Various techniques for conducting secure online transactions using a captcha image as a watermark are provided. In some embodiments, the techniques combine a trusted, secure device that utilizes a key to generate secure identifiers (e.g., numbers, alpha-numeric strings, etc.) with watermarking the secure identifiers taken as a captcha image. The techniques utilize watermarks using captcha images of the secure identifiers to improve on the traditional transaction model. In some embodiments, the techniques utilize watermarks using a Human Interactive Proof, which are challenges human users can or are able to answer but "computers" or "computer programs" cannot, image of the secure identifiers.

In a traditional transaction model, a user uses a client machine, such as a personal computer, to access and conduct transactions on a transaction server, such as a web server provided by a merchant. In order to conduct transactions on the server, the user typically logs onto the server by providing valid identification information, such as login identification and password. In response, the server authenticates the user as an authorized user, and provides the user access to the server. Upon gaining access, the user uses his or her client machine and requests a transaction to be performed on the server. In response, the server requests that the user verify the transaction by displaying details of the transaction on the user's client machine. The user then views—e.g., looks at—the displayed transaction, and uses his or her client machine to either "accept" the transaction or "deny" the displayed transaction. In response to the user accepting the transaction, the server performs the transaction and displays a receipt on the users client machine.

In some embodiments, a human being (referred to herein as a "user") obtains a trusted, secure device to use to conduct transactions with a transaction provider, such as, by way of example, a merchant, a service provider, a financial institution, an entity (e.g., company, corporation, etc.), a computing system or network appliance/machine, network, etc. The user may obtain the trusted, secure device from the transaction provider or an authorized third party. The trusted, secure devices that are provided to the users by the transaction provider are "keyed" to the transaction provider's server. This enables the transaction provider's server to determine the identifiers that are currently being generated by any of the trusted, secure devices. Thus, for a transaction involving a user with such a trusted, secure device, the transaction provider is able to: determine a secure identifier that should be being currently generated by the user's trusted, secure device; generate a captcha image using the secure identifier; and use a visual watermark using the captcha image of the secure identifier to improve on the traditional transaction model. In particular, the transaction provider watermarks a transaction verification request page that comprises details of a transaction with the captcha image of the secure identifier. The transaction provider sends this watermarked transaction verification request page to the user for visual verification, and commits the transaction only upon receiving from the user the next secure identifier generated by the users trusted, secure device.

For example, Mary may want to transfer $500 from her savings account to her checking account. To perform this account transfer, Mary uses a web browser program executing on her computer to visit her bank's website. Once at the bank's website, Mary logs in to the bank's website by providing, for example, a login identifier and a PIN. Having successfully logged in, Mary accesses a transaction web page, sets up the desired account transfer, and clicks on a "transfer" button to request the transaction. In response, the bank's website creates a transaction verification request page that includes details of the requested transaction (e.g. account transfer). The bank's website also determines Mary's trusted, secure device and an identifier (e.g., a number) that should be being currently generated by Mary's trusted, secure device. The bank's website creates a captcha image of this number, and visually watermarks the transaction verification request page with this captcha image. The bank's website then sends the watermarked transaction verification request page to Mary's computer, causing the watermarked transaction verification request page to be displayed on Mary's computer's screen. Mary then verifies that the transaction verification request was sent by her bank by comparing and matching the captcha number with the number currently being generated and displayed on her trusted, secure device. Assuming that the numbers match (i.e., Mary confirms that the transaction verification request page was sent by her bank), Mary visually inspects the details of the transaction displayed in the transaction verification request page, and if the details of the transaction are correct, Mary enters in an appropriate field in the transaction verification request page the next number that is generated and displayed on her trusted, secure device. Mary then clicks on an "accept" button provided in the transaction verification requests page to accept—i.e., verify, authenticate or authorize—the transaction. In response, Mary's computer sends the entered number to the bank's website. Upon receiving the number, the bank's website checks to determine if the received number is the number that should be being currently generated by Mary's trusted, secure device immediately after the number that was used to create the captcha image for Mary's transaction. If the received number is the expected number, the bank's website performs—i.e., commits—the account transfer. Upon committing the transaction, the bank's website can create and transmit a transaction receipt page to Mary's computer. The bank's website may watermark the transaction receipt page with a captcha image of a number that should be being currently generated on Mary's trusted, secure device. Mary's computer receives and displays the transaction receipt page on its screen.

FIG. 1 is a high-level block diagram showing an environment in which the secure online transactions may operate. As depicted, the environment comprises a user 102, a trusted, secure device 104, and a client computing system 106 coupled to a server computing system 108 via a network 110. In particular, the trusted, secure device enable the user to use his or her client computing system to transact with the server computing system via the network to facilitate a secure online transaction. Only one user, client computing system, and server computing system are shown in FIG. 1 for simplicity and one skilled in the art will appreciate that there may be a different number of users, client computing systems, and/or server computing systems. As used herein, the terms "connected," "coupled," or any variant thereof, means any connection or coupling, either direct or indirect, between two or more elements; the coupling of the connection between the elements can be physical, logical, or a combination thereof.

The user is any human user that wants to transact with a transaction provider, such as a bank. The trusted, secure device (e.g., a token (sometimes called a security token or an authentication token)) may be issued to the user by the transaction provider or an authorized third party. In some embodiments, the trusted, secure device may provide an extra level of assurance through a method known as two-factor authentication. For example, the user has a PIN which authorizes the user as the owner (i.e., rightful user) of a particular trusted, secure device that was distributed to the user by, for example, the transaction provider. The user's trusted, secure device then displays an identification number which uniquely identifies the user to the transaction provider, allowing the user to transact with the transaction provider (e.g., log in to the transaction provider, transact with the transaction provider, log in to a network, etc.). The identification number generated by the trusted, secure device changes frequently. For example, the trusted, secure devices change the identification number once every few seconds (e.g., once every nine to ten seconds) to once every few minutes (e.g., once every one to two minutes). The transaction provider uniquely assigns the trusted, secure device to the user and, thus, the transaction provider is able to key the trusted, secure device (i.e., the transaction provider is able to determine at any time the unique identifier that should be being currently generated by the trusted, secure device).

In general terms, the client computing system includes a client application program that enables its user to access and transact with the server computing system. In operation, a user executes the client application on the client computing system and uses the client application to connect to and securely transact with a server application that is executing on the server computing system. For example, the client may be a web browser application or other interface application that is suitable for connecting to and communicating with the server application. In some embodiments, the client application may be included in a kiosk, ATM terminal, or other terminal device that is coupled to the server.

In general terms, the server computing system includes a server application or applications, including application servers, web servers, databases, and other necessary hardware and/or software components, to facilitate secure transactions on the server. For example, the server computing system is provided by the transaction provider, and allows users to connect to the server application to perform one or more secure transactions.

The network is a communications link that facilitates the transfer of electronic content between, for example, the attached client computing system and server computing system. In one embodiment, the network includes the Internet. It will be appreciated that the network may be comprised of one or more other types of networks, such as a local area network, a wide area network, a point-to-point dial-up connection, and the like.

The client computer system and the server computer system may include one or more central processing units, memory, input devices (e.g., keyboard and pointing devices), output devices (e.g., display devices), and storage devices (e.g., disk drives). The memory and storage devices are computer-readable media that may contain instructions that implement the server application, client application, and other components. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on. One of ordinary skill in the art will appreciate that the computer systems may be of various configurations having various components.

Embodiments of the described techniques may be implemented in various operating environments that include personal computers, server computers, computing devices, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, kiosks, ATMs, and so on.

The techniques for using captcha images as watermarks to provide secure transactions may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

In the discussion that follows, various embodiments of the techniques for conducting secure transactions by using captcha images as watermarks will be further described as pertaining to a banking transaction. It will be appreciated that many applications of the described techniques could be formulated and that the embodiments of the techniques for conducting secure transactions may be used in circumstances that diverge significantly from these examples in various respects. As such, the term "transaction" may refer to any transaction that may require verification of the transaction by the transaction requester. Examples of these transactions include, without limitation, financial transactions (e.g., banking, brokerage, insurance, bill payment, etc.), access or login to a company's network, modification of configuration information (e.g., network configuration, server configuration, firewall/router configuration, etc.), electronic or online shopping, and access to or performance of any restricted service or operation.

Figure 2:
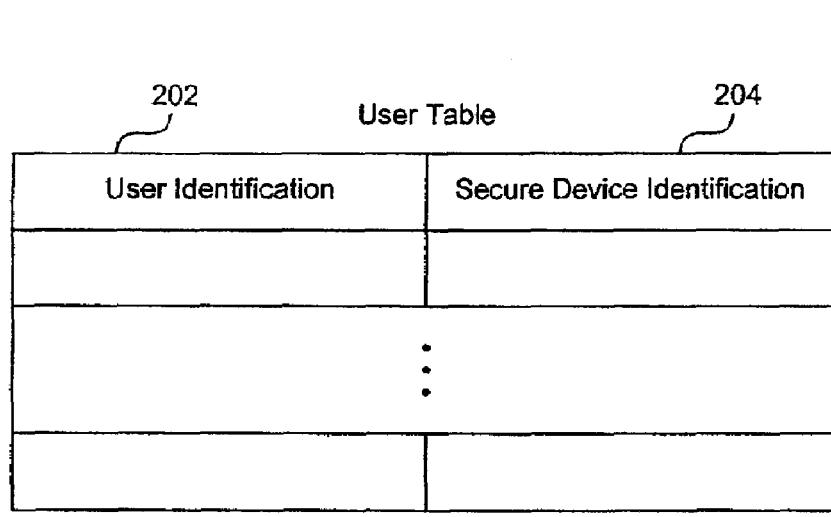
FIG. 2 is a block diagram that illustrates an example user table, according to some embodiments.

FIG. 2 is a block diagram that illustrates an example user table 20, according to some embodiments. The user table enables the transaction provider and, in particular, the transaction server to maintain a record of the trusted, secure devices that are distributed to its users (e.g., consumers, employees, etc.). By way of example, the user table is illustrated as comprising a plurality of records, each record comprising a user identification field 202, and a secure device identification field 204. The user identification field identifies a user. For example, the user identification field may contain an identifier (e.g., login identification and password, account number and PIN, PIN, etc.) that uniquely identifies the user. The secure device identification field identifies a trusted, secure device. For example, the secure device identification field may contain an identifier (e.g., a serial number, identifier of the key/algorithm included in the trusted, secure device, etc.) that uniquely identifies the trusted, secure device. Thus, each record in the user table identifies a trusted, secure device and the rightful user of the trusted, secure device (i.e., the user that the trusted, secure device was distributed to), and allows the transaction server to determine, at any given instance in time, a number that should be being currently generated and displayed on a particular user's trusted, secure device.

FIG. 3 is a display diagram showing a sample transaction verification request page having a captcha image as a watermark, according to some embodiments. As depicted, transaction verification page 30 comprises a display area 302 displaying a visual watermark 304, and a user input box 306. The transaction server creates a transaction verification request page for each received transaction request, for example, from a user using a client. The transaction server sends the transaction verification request page to the client, requesting that the user check the details of the requested transaction as displayed in the transaction verification request page and verify (i.e., authorize) the transaction. The transaction verification request page is typically presented in a client area of a window displayed by a web browser program executing on the client.

The details of the transaction are shown in the display area of the transaction verification request page. The transaction verification request page is watermarked with a captcha image of an identifier (e.g., a number, an alpha-numeric string, etc.) that should be being currently generated by the user's trusted, secure device. The user input box allows the user to input the next identifier that is generated by the user's trusted, secure device as, for example, a challenge to verify the details of the user's transaction as shown in the display area of the transaction verification request page. Watermarking the display area using the captcha image makes it difficult for someone other than the user, such as a trojan or other undesirable computer process executing on the client computing system, to discern the details of the transaction shown in the display area of the transaction verification request page.

The challenge (i.e., the user inputting the next identifier that is generated by the users trusted, secure device) is required for the transaction server to commit the transaction displayed in the display area of the transaction verification request page. The challenge is "tied" to the displayed transaction and is valid to verify only that transaction. In some embodiments, the transaction server needs to receive the challenge within a predetermined length of time (e.g., 9 seconds, 10, seconds, etc.) from the time the transaction server requested that the user to verify the user's transaction. In some embodiments, the transaction server needs to receive and process the challenge while the user's trusted, secure device is still generating the number submitted by the user as the challenge. Stated anther way, the transaction server needs to process the user's verification of the transaction while the user's trusted, secure device is still generating the next identifier (i.e., before the users trusted, secure device proceeds to generate the identifier following the next identifier).

Figure 4:
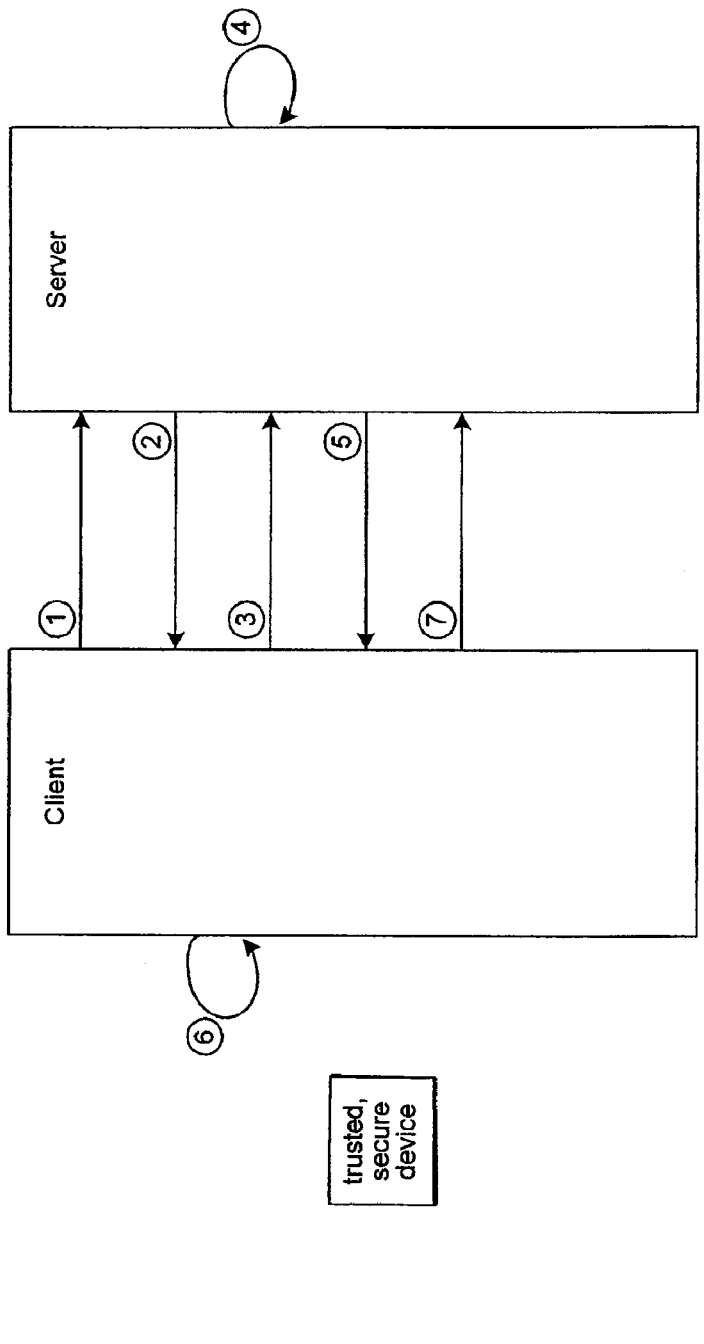
FIG. 4 is a diagram illustrating the interaction between a user, a client, and a server to conduct a secure online transaction, according to some embodiments.

FIG. 4 is a diagram illustrating the interaction between a user, a client, and a server to conduct a secure online transaction, according to some embodiments. By way of example, the user, who is a customer of a bank, may have previously received from the bank a trusted, secure device to use in performing online transactions with the bank's web server. Subsequently, the user, wanting to transfer $500 from the user's savings account to the user's credit card account to pay the balance due on the user's credit card, initiates the online banking transaction by invoking a client application, such as a web browser, on the user's computing system and navigating to the bank's website served, for example, by the bank's web server. In stage 1, once at the bank's website, the user logs on to access the user's savings account and otherwise transact with the bank by providing authenticating information, such as login identification (e.g., savings account number, authenticating identifier, etc.) and a password or a PIN.

In stage 2, the bank's web server uses the received login information to authenticate the user. Upon authenticating the user (e.g., as a customer of the bank), the bank's web server may transmit to the user's web browser a web page through which the user can request various transactions. In stage 3, the user navigates to a suitable web page and requests to transfer $500 from the users savings account to the user's credit card account. For example, the user may enter the amount to transfer, the savings account number, and the credit card account number into appropriate fields in the web page and click on a "transfer funds" button on the web page to request the specified transaction. In response, the web browser transmits the user's request to transfer the funds to the banks web server.

In stage 4, the bank's web server receives the transaction request (i.e., the request to transfer $500 from the user's savings account to the user's credit card account), and generates a transaction verification request page to send to the user for verification of the user's transaction by the user. The bank's web server identifies the user and the trusted, secure device that was previously distributed to the user. The bank's web server then determines an identifier that should be being currently generated by the user's trusted, secure device, creates a captcha image of the identifier, and watermarks the transaction verification request page with the captcha image. The bank's web server uses the captcha image watermark to guarantee to the user that the transaction verification request page and the transaction details shown in the transaction verification request page are from the bank. In stage 5, the bank's web server sends the watermarked transaction verification request page to the user's client for verification by the user.

In stage 6, the web browser executing on the user's computing system displays the received transaction verification request page. The user visually verifies the transaction details shown in the transaction verification request page. The user also checks the watermark to verify that the identifier used for the captcha image is the same as the identifier that is currently being generated by his or her trusted, secure device. If the identifier used for the captcha image matches the identifier that is currently being generated by the user's trusted, secure device the user is sufficiently assured that the transaction verification request is from the user's bank and not some other malicious entity or process. Assuming that the identifier used for the captcha image matches the identifier that is currently being generated on the user's trusted, secure device, the user waits for or otherwise obtains the next, subsequent identifier that is being generated on his or her trusted, secure device. For example, the user may have to wait until the next identifier is generated and displayed by his or her trusted, secure device. The amount of time the user needs to wait for the next identifier to be generated by the trusted, secure device depends on the frequency with which the device generates and displays the identifiers. The user then inputs the next identifier in the appropriate input area on the transaction verification request page and clicks on, for example, a "submit" button provided on the transaction verification request page. By inputting the next identifier (i.e., performing the requested challenge), the user is verifying the transaction displayed in the transaction verification request page. In stage 7, in response to the user clicking the "submit" button, the web browser sends the user-input next identifier to the bank's web server as verification of the transaction.

In some embodiments, a portion of the identifier may be used for the captcha image and another portion of the same identifier may be used as the "secret" or challenge that is to be entered by the user. For example, the first half of the identifier may be used for the captcha image. Once the user verifies that the captcha image matches the first half of the identifier that is currently generated on the user's trusted, secure device, the user can input the second half of the identifier to verify the transaction.

One skilled in the art will appreciate that, for this and other processes and methods disclosed herein, the outlined steps are only exemplary, and some of the steps may be optional, combined with fewer steps, or expanded into additional steps without detracting from the essence of the invention. For example, in various embodiments, some or all of the data transmitted between the client and the server may be encrypted by the sender and decrypted by the receiver to provide added security. For example, the client and the server may exchange their public keys, and the sender may encrypt the data using the receiver's public key prior to transmitting the data. Moreover, some or all of the data transmitted between the client and the server may be signed by the sender.

Figure 5:
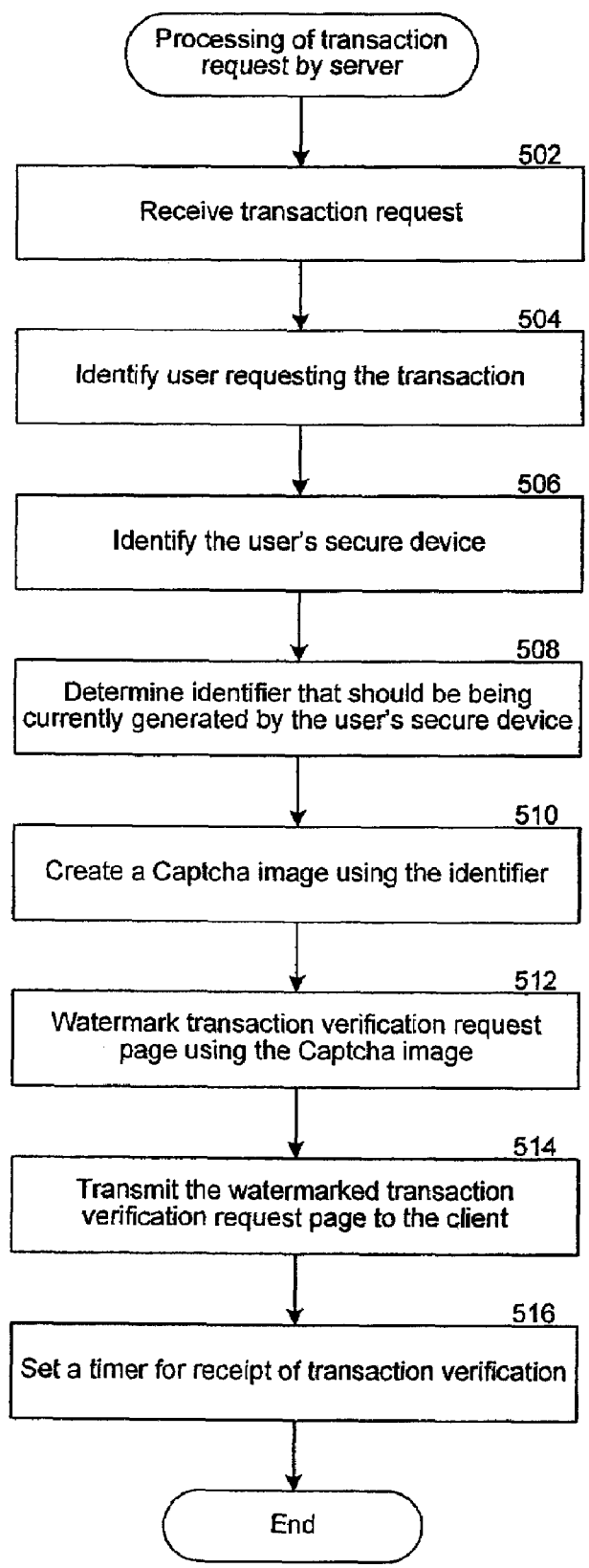
FIG. 5 is a flow diagram illustrating the processing of a transaction request by a server, according to some embodiments.

FIG. 5 is a flow diagram illustrating the processing of a transaction request by a server, according to some embodiments. In block 502, the server (e.g., the bank's web server) receives a transaction request (e.g., the request to transfer $500 from the users savings account to the user's credit card account).

In block 504, the server identifies the user that is requesting the transaction. For example, server may identify the user from or using the information received or associated with the transaction request.

In block 506, the server identifies the user's trusted, secure device. The trusted, secure device is the device that was distributed to the user for the user's use in transacting with the server. For example, the server may identify the users trusted, secure device from the data in the user table. In block 508, the server determines an identifier that should be being currently generated by the user's secure device. In block 510, the server creates a captcha image using the identifier.

The trusted, secure devices that are distributed to the users for their use in transacting with the server are each keyed to the server. This allows the server to determine the identifier that should be being generated by any particular trusted, secure device. For example, assuming that each trusted, secure device includes a random number generator or other suitable algorithm that generates the identifiers on the trusted, secure devices, the server may keep a copy of the random number generators and maintain a record of each random number generator and its corresponding trusted, secure device.

In block 512, the server watermarks a transaction verification request page with the captcha image created in block 510. The transaction verification request page shows details of the user's requested transaction and requests the user to verify or authorize the displayed transaction. In some embodiments, the transaction verification request page instructs the user to input the next identifier generated by the user's trusted, secure device after the identifier displayed in the captcha image in the transaction verification request page, to verify the transaction.

In block 514, the server transmits the watermarked transaction verification request page to the requesting client application (e.g., the client application used to request the transaction). In block 516, the server may set a timer for the transaction verification request. The timer indicates a time period within which the server needs to receive from the user the user's verification of the details of the transaction shown in the transaction verification request page. If the server fails to receive the user's verification (i.e., the requested challenge) before the corresponding timer expires, the server "aborts" the user's transaction (e.g., the server does not commit the user's transaction). In some embodiments, the timer depends on the frequency with which the identified user's trusted, secure device generates the identifiers.

Figure 6:
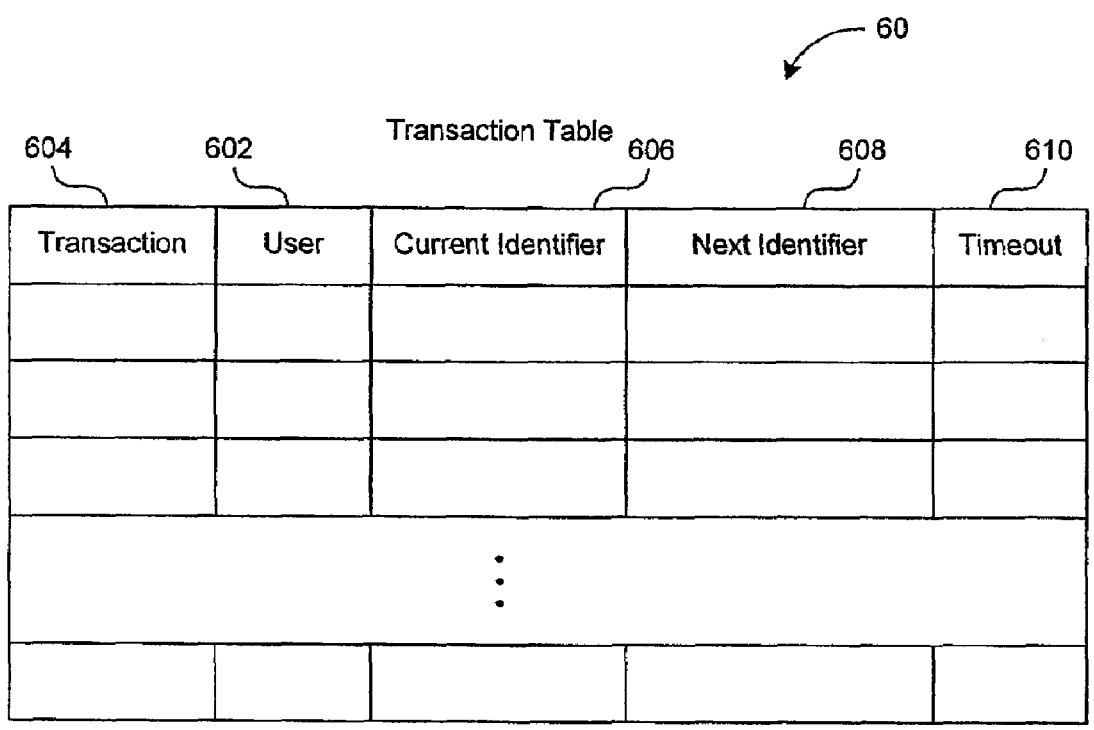
FIG. 6 is a block diagram that illustrates an example transaction table, according to some embodiments.

FIG. 6 is a block diagram that illustrates an example transaction table, according to some embodiments. The transaction table enables the transaction provider and, in particular, the transaction server to maintain a record of the transactions that are being performed by the transaction server. By way of example, the transaction table is illustrated as comprising a plurality of records, each record comprising a transaction field 602, a user field 604, a current identifier field 606, a next identifier field 608, and a timeout field 610. In some embodiments, the transaction server maintains a transaction table and creates a record in the transaction table for each received transaction request. For example, the bank's web server creates a record in the transaction table for the users request to transfer $500 from the user's savings account to the user's credit card account.

The transaction field identifies the transaction that is being processed by the transaction server. The user field identifies the user that requested the transaction identified in the transaction field. The current identifier field contains the identifier that was used to create the captcha image, and which was included in the transaction verification request page for the transaction identified in the transaction field. The next identifier field contains the identifier that is required to commit the transaction identified in the transaction field. This identifier is the next identifier that should be generated by the user's trusted, secure device immediately following the identifier specified in the current identifier field. The contents of the next identifier field may not be available at the time the record is created. For example, assuming that the trusted, secure devices generate a new identifier every ten seconds, the transaction server, or other appropriate process, may need to wait up to approximately ten seconds before being able to determine the next or subsequent identifier generated by a particular trusted, secure device. When the transaction server is able to determine the next or subsequent identifier that should be being generated by the trusted, secure device belonging to the user identified in the user field, the transaction server may determine the subsequent identifier and record the subsequent identifier in the next identifier field. The timeout field indicates whether the timer corresponding to the transaction identified in the transaction field has expired.

Figure 7:
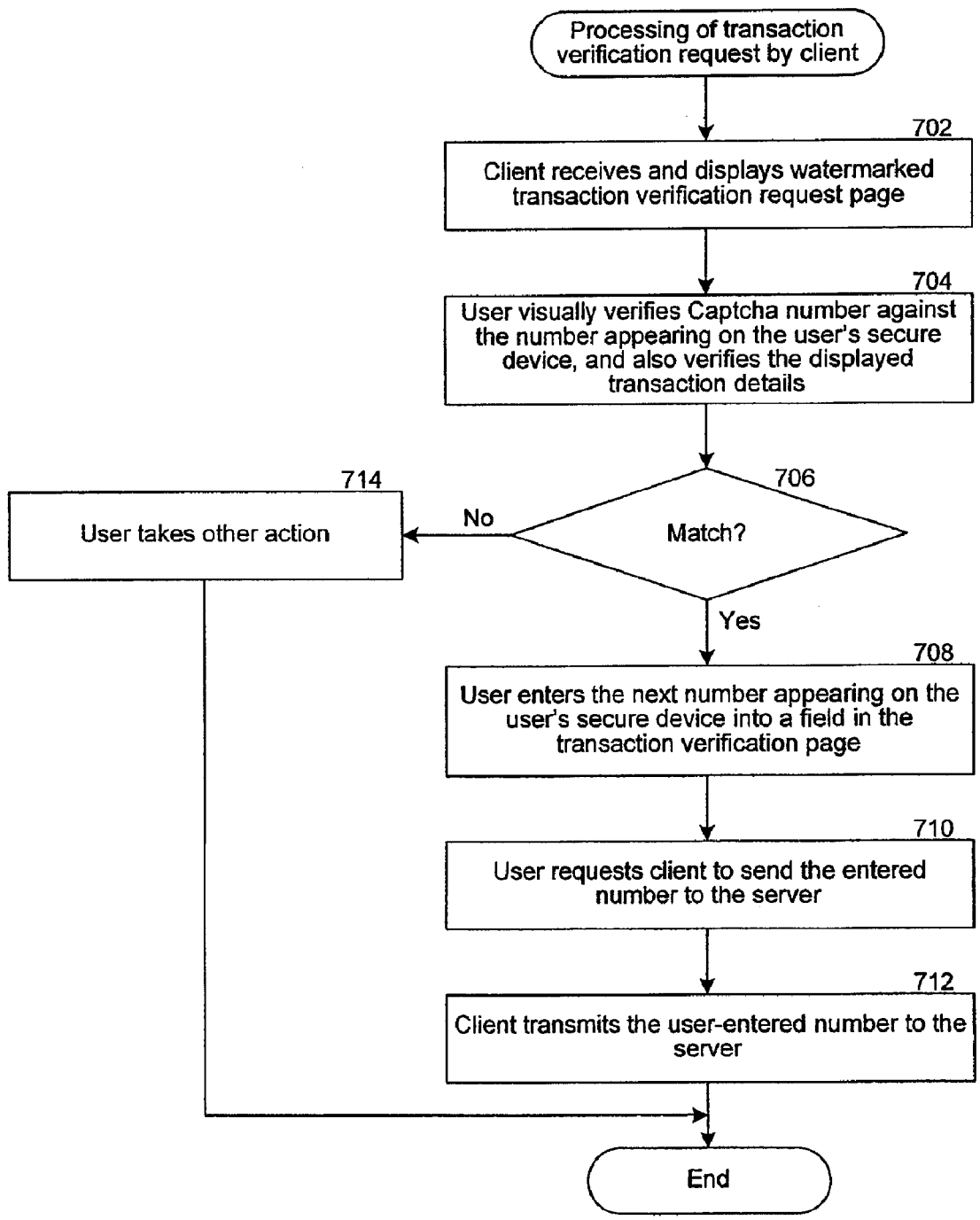
FIG. 7 is a flow diagram illustrating the processing of a transaction verification request by a client, according to some embodiments.

FIG. 7 is a flow diagram illustrating the processing of a transaction verification request by a client, according to some embodiments. In block 702, the client (e.g., the user's web browser) receives and displays a watermarked transaction verification request page on the computing system's screen. For example, the transaction shown in the transaction verification request page may be the user's previously submitted request to transfer $500 from the user's savings account to the user's credit card account. In block 704, the user visually verifies the number used in captcha image against the number that is currently appearing on the user's secure device's screen, and the transaction details displayed in the transaction verification request page.

If, in block 706, the number used in the captcha image matches the number appearing on the user's secure device, and the transaction described in the transaction verification request page is the transaction requested by the user, then, in block 708, the user enters the next number appearing on his or her secure device into a field in the transaction versification request page to verify the displayed transaction. In block 710, the user requests the client to send the user-entered number to the transaction server (i.e., the server that sent the transaction verification request page). For example, the user may click on a button provided on the transaction verification request page or hit the "enter" button on a keyboard to request the client to send the user-entered number. In block 712, the client transmits the user-entered number to the transaction server.

If, in block 706, the number used in the captcha image fails to match the number appearing on the user's secure device, or the transaction described in the transaction verification request page does not accurately describe the transaction requested by the user, then, in block 714, the user takes an action other than verifying the displayed transaction. For example, the user may click on an "abort" or "cancel" button provided on the transaction verification request page to abort/cancel the transaction on the transaction server. In this instance, the user does not perform the requested challenge (i.e., the user does not provide the next number appearing on his or her secure device's screen).

Figure 8:
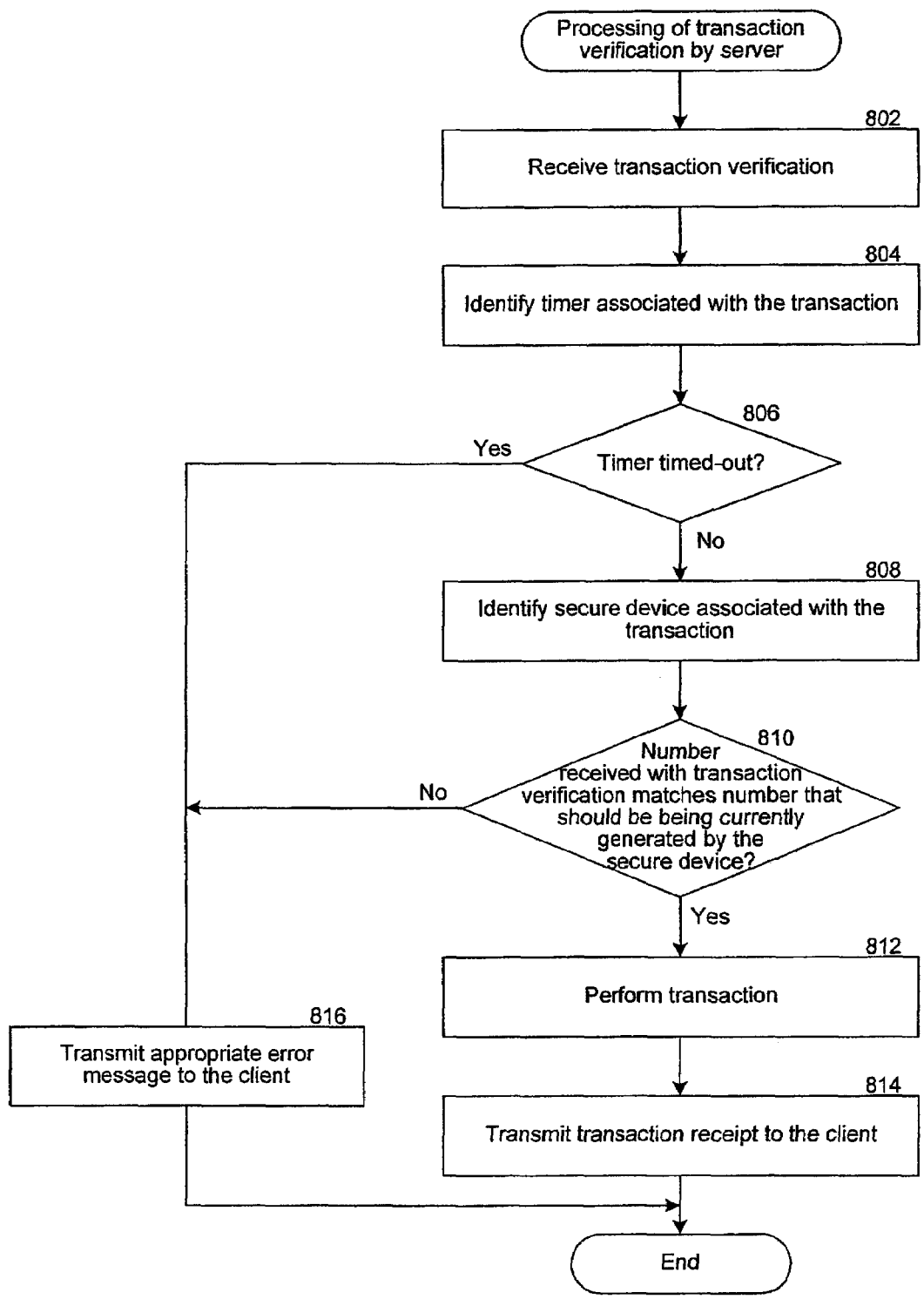
FIG. 8 is a flow diagram illustrating the processing of a transaction verification by a server, according to some embodiments.

FIG. 8 is a flow diagram illustrating the processing of a transaction verification by a server, according to some embodiments. In block 802, the server receives a transaction verification from a client. In some embodiments, the transaction verification includes the next number generated by the user's trusted, secure device, which was entered by the user to verify the transaction described in the transaction verification request page. For example, the bank's web server may receive the user's verification of the transaction regarding the transfer of $500 from the user's savings account to the users credit card account which was included in a previous transaction verification request sent by the web server to the users client.

In block 804, the server identifies the timer associated with the transaction. In block 806, the server checks to determine if the timer timed-out. If the timer did not time-out, then, in block 808, the server identifies the trusted, secure device associated with the transaction (i.e., the transaction verification). For example, the server may identify the trusted, secure device from the transaction table and/or the user table. In block 810, the server checks to determine if the number that should be being currently generated by the identified trusted, secure device matches the number received with the transaction verification. The number that should be being currently generated by the identified trusted, secure device is the next number that is generated by the trusted, secure device immediately after the number used by the server to create the captcha image used as the watermark in the transaction verification request page corresponding to the transaction. For example, the server can identify the record that corresponds to the transaction in the transaction table. The server can then check to determine if the number received with the transaction verification matches the contents of the next identifier field in the identified record. The number (i.e., the contents) in the next identifier field is the number (i.e., challenge) that the server requires from the user before committing or completing the transaction on the server.

If the number received with the transaction verification matches the number required to commit the transaction (block 810), then, in block 812, the server finishes performing the requested transaction. For example, the bank's web server actually transfers $500 from the user's savings account to the user's credit card account. In block 814, the server transmits a transaction receipt to the client. For example, the bank's web server may send a transaction receipt page that indicates that $500 was transferred from the users savings account to the users credit card account. The receipt page may also indicate the current balances of the two accounts as a result of the requested transaction. In some embodiments, in a manner similar to the transaction verification request page, the server may watermark the transaction receipt page with a captcha image of a number that should be being currently generated on the user's trusted, secure device. By watermarking the transaction receipt in this manner, the server is guaranteeing to the user that the transaction receipt is from the server, and the user can use the captcha image to verify that the transaction was processed by the server.

Otherwise, if the server determines that either the timer timed-out (block 806) or the number received with the transaction verification fails to match the number required to commit the transaction (block 810), then, in block 816, the server can transmit an appropriate error message to the client. For example, the error message may indicate that the user failed to timely respond to the transaction verification request, the number provided by the user is not the number expected by the server to commit the transaction, etc. In this instance, the server does not complete the transaction associated with the received transaction verification. In some embodiments, in a manner similar to the transaction verification request page, the server may watermark the error message with a captcha image of a number that should be being currently generated on the user's trusted, secure device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-readable medium whose contents cause a computing system of a transaction provider to:
   receive a request from a client computing device of a user to perform a transaction, the user having a security token that generates and outputs an alpha-numeric string that changes over time, the user's security token being different from the client computing device, the transaction provider being able to determine the alpha-numeric string currently being generated by the user's security token; and
   in response to receiving the request:
      identify the user requesting the transaction;
      identify the user's security token;
      determine an alpha-numeric string that should be currently generated by the user's security token;
      create a captcha image using the alpha-numeric string;
      create a transaction verification page comprising the captcha image of the alpha-numeric string as a visible watermark, the transaction verification page requesting a next alpha-numeric string to be generated by the user's security token to verify the transaction; and
      transmit the transaction verification page to the client computing device so that the client computing device can display the transaction verification page so the user can view the alpha-numeric string to determine whether the same alpha-numeric string is currently being generated by the user's security token and thus authenticating the computing system of the transaction provider.

2. The computer-readable medium of claim 1, wherein the security token is a random number generator.

3. The computer-readable medium of claim 1, wherein the transaction is an online banking transaction.

4. The computer-readable medium of claim 1, wherein the transaction is an online trading transaction.

5. The computer-readable medium of claim 1, wherein the transaction is an electronic purchase transaction.

6. A computer-readable medium whose contents cause a computing system to:
   receive a request from a client to perform a transaction; and
   in response to receiving the request:
      identify a user requesting the transaction;
      identify the user's secure device;
      determine an alpha-numeric string that should be currently generated by the user's secure device;
      create a captcha image using the alpha-numeric string;
      create a transaction verification page comprising the captcha image of the alpha-numeric string as a visible watermark, the transaction verification page requesting a next alpha-numeric string to be generated by the user's secure device to verify the transaction; and
   transmit the transaction verification page to the client further comprising contents that cause the computing system to:
      receive from the client a user-entered string;
      identify a transaction corresponding to the user-entered string;
      identify a user that requested the transaction;
      identify the user's secure device;
      compare the user-entered string with an alpha-numeric string that should be currently generated by the user's secure device; and in response to the user-entered string matching the alpha-numeric string that should be currently generated by the user's secure device, commit the identified transaction; and in response to the user-entered string not matching the alpha-numeric string that should be currently generated by the user's secure device, abort the identified transaction.

7. The computer-readable medium of claim 6 further comprising contents that cause the computing system to:
in response to committing the identified transaction:
determine an alpha-numeric string that should be currently generated by the user's secure device;
create a captcha image using the alpha-numeric string;
create a transaction receipt page comprising the captcha image of the alpha-numeric string as a visible watermark; and
transmit the transaction receipt page to the client.

8. A method in a transaction provider computing system for providing secure transactions, the method comprising:
maintaining a plurality of records, each record comprising an indication of a user and an indication of a security token distributed to the user, the security token for generating a sequence of identifiers according to an algorithm that is known to the transaction provider computing system;
receiving from a client computing system a request to perform a transaction, the user's security token being different from the client computing system;
identifying a user requesting the transaction;
determining an identifier that should be currently generated by the user's security token using the algorithm that is known to the transaction provider computing system;
creating a transaction verification page comprising information regarding the transaction, the transaction verification page watermarked with a captcha image of the identifier as a visible watermark so that the user can verify that the transaction provider computing system knows the algorithm, the transaction verification page requesting a next identifier to be generated by the user's security token to commit the transaction;
transmitting the transaction verification page to the client computing system;
receiving from the client computing system an identifier;
comparing the received identifier to the identifier next generated by the algorithm to verify that the user has access to the user's security token; and when the compared identifiers are the same, allowing the transaction to proceed.

9. The method of claim 8, wherein the plurality of records are maintained in a database accessible by the transaction provider computing system.

10. The method of claim 8, wherein the transaction provider computing system is provided by a merchant.

11. The method of claim 10, wherein the merchant is a financial institution providing financial services to users via the transaction provider computing system.

12. The method of claim 8, wherein the security token is a key fob.

13. A method in a client computing system for providing secure transactions, the method comprising:
receiving from a transaction provider a transaction verification page including a captcha image of an alpha-numeric string as a visible watermark, the transaction verification page requesting a next alpha-numeric string to be generated by a user's security token to verify a transaction, the user's security token being different from the client computing system; and
in response to receiving the transaction verification page:
displaying the transaction verification page and the included captcha image of the alpha-numeric string, such that the user can verify that the captcha image of the alpha-numeric string matches an alpha-numeric that is being generated by the user's security token;
receiving an input alpha-numeric string from the user, the alpha-numeric string being next generated by the user's security token; and
transmitting to the transaction provider the input alpha-numeric string in response to the next alpha-numeric string requested by the transaction verification page, such that the transaction provider can verify that the transmitted input alpha-numeric string is the next alpha-numeric string generated by the user's security token immediately after the alpha-numeric string displayed as the captcha image in the transaction verification page.

14. The method of claim 13, wherein the transaction is an online transaction.

15. The method of claim 13, wherein the transaction is a configuration operation.

16. The method of claim 13, wherein the transaction is a banking transaction.

\* \* \* \* \*